March 23, 1954

W. B. PUSEY ET AL 2,673,129

BEARING MOUNTING

Filed July 27, 1950

INVENTOR
ATTILIO R. SPICACCI
WESLEY B. PUSEY

BY

ATTORNEY

Patented Mar. 23, 1954

2,673,129

UNITED STATES PATENT OFFICE 2,673,129

BEARING MOUNTING

Wesley Burrell Pusey and Attilio Regulus Spicacci, Lancaster, Pa., assignors to Bearings Company of America, Lancaster, Pa.

Application July 27, 1950, Serial No. 176,146

1 Claim. (Cl. 308—178)

This invention relates to a bearing mounting, more particularly to that type of mounting known as a pillow block.

The object of the present invention is to provide a compact unit, easy to manufacture and at a low cost.

The usual type of pillow block consists of an anti-friction bearing fitted into a cast iron or steel, flange or secondary support. In order to function properly, the outside diameter of the anti-friction bearing must fit very closely into the bore of the pillow block calling for very close tolerances for the fitting parts. In addition, means must be provided to hold the bearing axially to locate the rotating shaft and to take thrust when and where encountered. Furthermore, the base of the pillow block must be machined so as to maintain the proper distance of the shaft to the base upon which the pillow block is fixed. These manufacturing operations are costly and the object of this invention is to dispense with the close fitting of the bearing into the pillow block as well as the means to fix the bearing into the pillow block and to eliminate the machining of the base.

To that end, the present invention provides an anti-friction bearing of the radial type which has an inner race of the conventional type but an outer ring materially thickened with a flattened portion registering against a flat plate for a base, a circumferential groove on the outer portion of said outer race, a U bolt fitted partly around this groove and having its ends extending into holes of the plate projecting beyond the plate, the ends of this U bolt threaded for convenience of anchoring the whole unit to a suitable structure by means of nuts.

To prevent the U bolt from cramping the outer race when the nuts are tightened at the base and to assure an integral unit, the U bolt is welded to the plate with the outer race ring held firmly and securely in place, the flattened part of the outer ring preventing relative rotation of this ring.

Thus, we have a structure which is compact, with the minimum number of parts, and the elimination of close fitting of the pillow block, with no variation or distortion of the bearing internal clearance and light in weight.

It is a further object of the present invention to provide a bearing having an inner and outer race, with the outer race materially thickened and provided with a flattened bottom portion and a grooved outer circumference and securing said outer race to a flat plate seating said outer race and secured thereto by a U bolt fitted in the circumferential groove of said outer race.

It is a further object of the present invention to provide a permanent structure by welding the U bolt to the plate.

It is a still further object of the present invention to provide an outer race for a bearing of unusual thickness and to form said outer race with a bottom flat and an upper circumferential groove.

It is a still further object of the present invention to form a bearing mounting for ball bearings which by reason of its construction is materially lighter in weight than the ordinary pillow block mounting.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is shown in the accompanying drawing in which.

Figure 2:
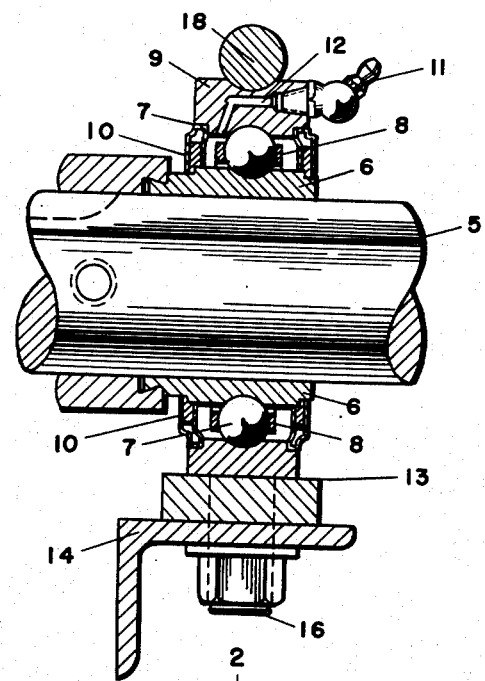
Figure 2 is a cross section on line 2—2 of Figure 1.
Figure 1:
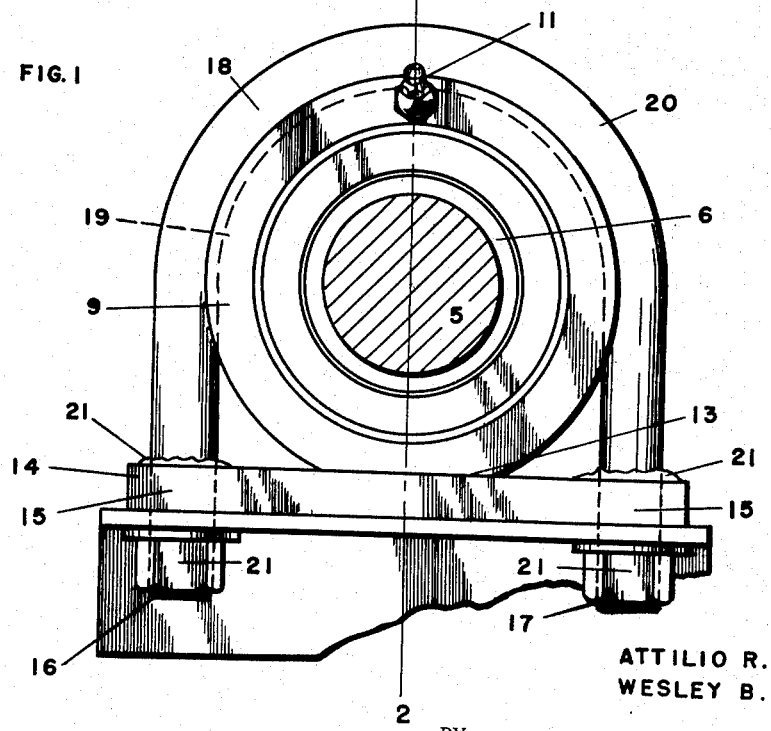
Figure 1 is an end view of the bearing mounting.

The bearing is illustrated as supporting a shaft 5 and is formed with an inner race 6, ball bearings 7, bearing retainers 8 and a heavy outer race 9. Grease retaining shields 10 are shown as conventional bearing construction, while a grease fitting 11 supplies grease to said bearing through a passage 12 in the outer race.

The outer race 9 is ground flat, as shown at 13, and seated on a base plate 14 which is formed with holes 15 to receive the ends 16 and 17 of the U bolt 18. The upper half of the outer race is formed with a circumferential groove 19 in which the curved portion 20 of the U bolt is seated. Nuts 21 are threaded on the ends 16 and 17 of the U bolt.

In the assembly the U bolt is forced by pressure down over the outer race and while under pressure, the U bolt is welded as at 21 to the plate 14. This then provides a unified structure for a bearing mounting at a low cost and with a minimum of machine work involved.

What is claimed is:

A bearing mounting comprising a bearing having an inner and an outer race, said outer race being formed with an outside circumferential flat portion and an oppositely disposed outside circumferential groove, said groove extending around more than 180° of said race, a base engaging said flattened portion and supporting said bearing, a U bolt fitting within a said groove and throughout the extent of said groove, the ends of said bolt passing through holes in said base, said bolt being welded to said base to provide a complete unit, the outer race being held against rotation or lateral movement, the ends of the bolt extending beyond said base to provide means for fastening said bearing as a unit to a fixture.

WESLEY BURRELL PUSEY.
ATTILIO REGULUS SPICACCI.

References Cited in the file of this patent

UNITED STATES PATENTS

| Number | Name | Date |
|---|---|---|
| 449,046 | Lovell | Mar. 24, 1891 |
| 729,356 | King | May 26, 1903 |
| 1,050,177 | Seaman | Jan. 14, 1913 |
| 1,924,937 | Leister | Aug. 29, 1933 |
| 2,180,282 | Leighton | Nov. 14, 1939 |
| 2,446,515 | Weingart | Aug. 3, 1948 |
| 2,467,994 | Ruist | Apr. 19, 1949 |